Feb. 2, 1926.  1,571,358
E. WILDHABER
METHOD OF RELIEVING MILLING CUTTER BLANKS
Original Filed Nov. 25, 1921   2 Sheets-Sheet 1
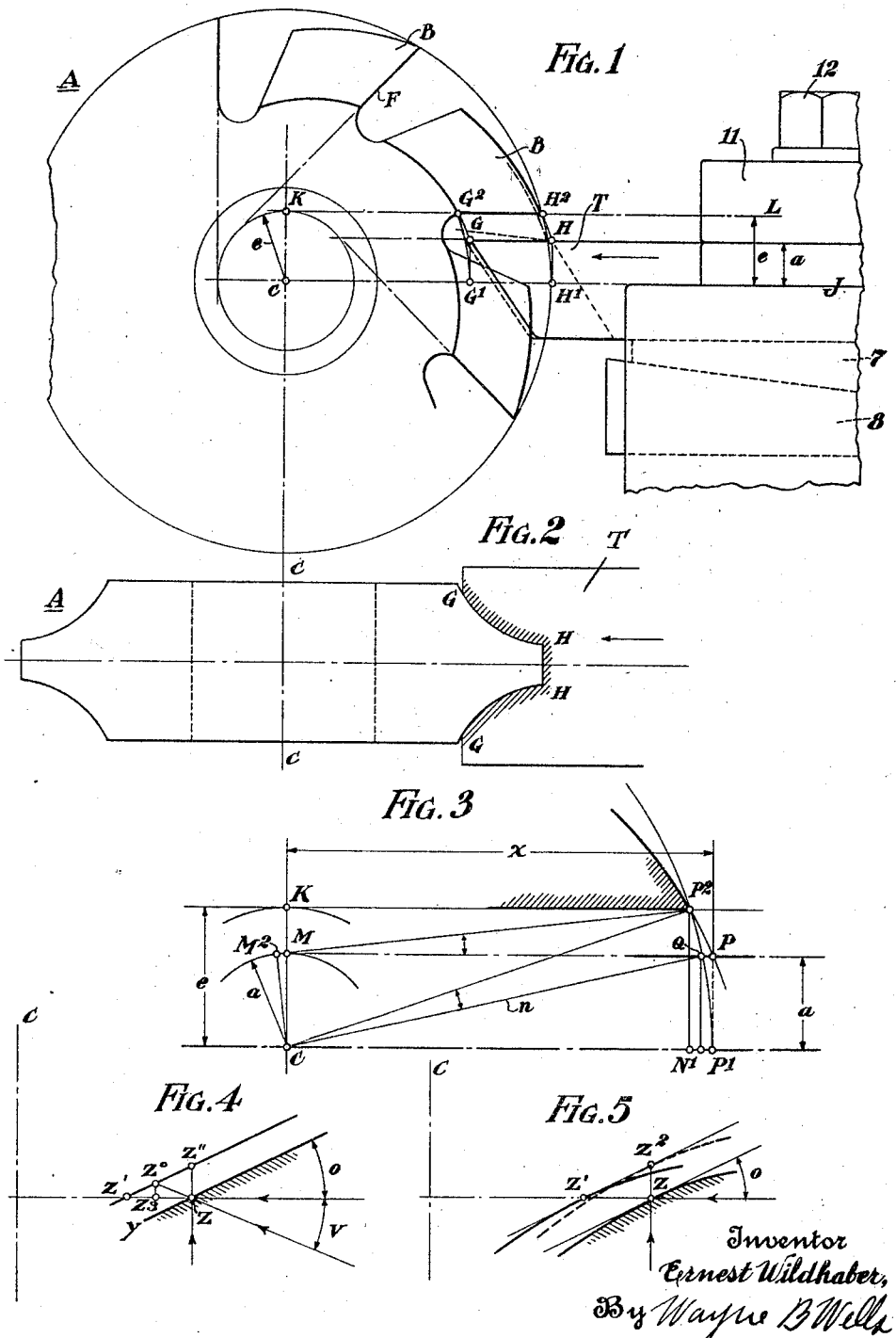

Feb. 2, 1926.
E. WILDHABER
1,571,358
METHOD OF RELIEVING MILLING CUTTER BLANKS
Original Filed Nov. 25, 1921   2 Sheets-Sheet 2
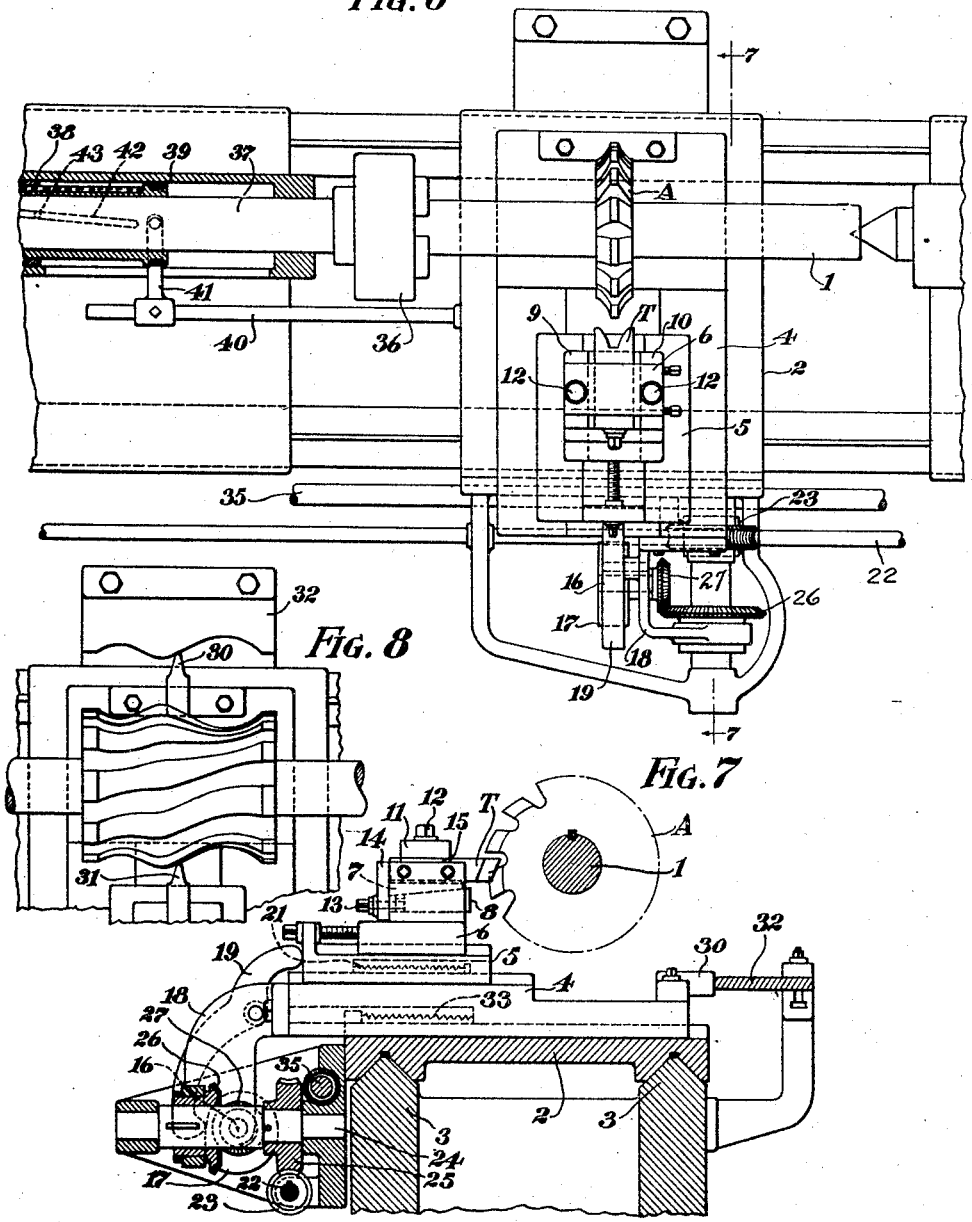
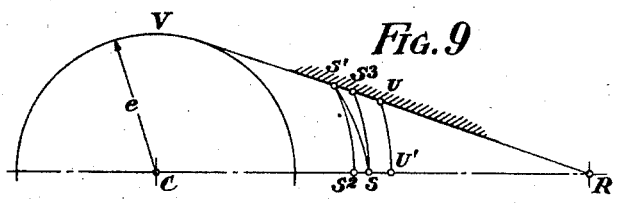
Inventor
Ernest Wildhaber,
By Wayne B Wells
Attorney Patented Feb. 2, 1926.

1,571,358

UNITED STATES PATENT OFFICE.

ERNEST WILDHABER, OF ROCHESTER, NEW YORK, ASSIGNOR TO NILES-BEMENT-POND COMPANY, OF NEW YORK, N. Y., A CORPORATION OF NEW JERSEY.

METHOD OF RELIEVING MILLING CUTTER BLANKS.

Application filed November 25, 1921, Serial No. 517,753. Renewed June 27, 1925.

*To all whom it may concern:*

Be it known that I, ERNEST WILDHABER, a citizen of the Republic of Switzerland, residing at Rochester, in the county of Monroe and State of New York, have invented certain new and useful Improvements in Methods of Relieving Milling Cutter Blanks, of which the following is a specification.

My invention relates to methods of shaping and relieving milling cutter blanks having teeth provided with non-radially arranged cutting faces.

One object of my invention is to provide a method of shaping a milling cutter blank, having teeth provided with undercut cutting faces, to cut a predetermined contour, by rotating the blank and by operating a cutting tool for relieving and for shaping the teeth of the blank to cut the predetermined contour, while so positioning and actuating the cutting tool as to compensate the relieving operation for the non-radial cutting faces on the blank teeth.

Another object of my invention is to provide a method of shaping a milling cutter blank, having teeth provided with undercut or non-radially arranged cutting faces, to cut a predetermined contour, which consists in rotating the blank, in providing an undistorted cutting tool having a cutting contour the same as the contour to be cut by the finished blank, and in operating the tool in a plane parallel to any axial plane through the blank, to relieve the teeth on the blank and to cut a distorted contour on the blank teeth which is adapted to cut the undistorted contour of the tool.

Another object of my invention is to provide a method of shaping a milling cutter blank, having teeth provided with undercut cutting faces, which consists in positioning an undistorted cutting tool in a plane parallel to an axial plane through the blank, the tool plane being located a distance from the axial plane which varies according to the undercut cutting faces and the relief to be formed on the teeth, and in operating the tool in that plane for relieving the blank teeth and for cutting a distorted contour on the blank teeth which is adapted to cut the undistorted contour of the cutting tool.

A further object of my invention is to provide a method of shaping a milling cutter blank having helical teeth provided with undercut or non-radially arranged cutting faces, which consists in rotating the blank, in so positioning a cutting tool in a plane parallel to an axial plane through the blank as to compensate the relieving operation for the undercut teeth, in operating the cutting tool in that plane relative to the blank for cutting the latter to different diameters, in operating the tool to spirally relieve the teeth on the blank, and in varying the rotation of the blank in accordance with the helical teeth thereon.

In manufacturing milling cutters and particularly in manufacturing milling cutters for cutting an irregular contour or a contour other than a straight line parallel to the cutter axes, it is very desirable to undercut the cutting faces of the teeth. However, trouble is experienced in relieving teeth on a cutter blank having undercut teeth. In such a cutter blank it is necessary to effect some compensation for the relief in accordance with the undercut on the cutting faces of the blank teeth. In the case of very narrow formed cutters, it is of small advantage to have helicoidal cutting faces although it is a decided advantage to undercut the cutting faces of the teeth on narrow cutters.

Heretofore it has been the practice to shape and relieve a narrow cutter blank, having undercut teeth, by means of a distorted formed tool. The distortion of the cutting contour of the tool was varied according to the plane of operation of the tool relative to an axial plane through the blank. Two methods are commonly in use at the present time, namely, that of moving a distorted formed tool radially into engagement with the blank and second that of moving a distorted formed tool towards the blank in a plane tangent to the so called hook or undercut circle. If the tool is moved along a radial line towards the axis of the blank, the contour of the tool must be shortened somewhat relative to the contour which is to be cut by the finished blank. If the tool is to be moved towards the blank in a plane tangent to the undercut circle, the contour on the tool must be lengthened relative to the contour which is to be cut by the finished blank. Neither of the above methods shape the cutter blank to cut the exact contour desired but in each case merely shape a blank which approximately cuts the desired contour. In case the contour to be cut is very irregular, it is very nearly impossible to distort a cutting tool so as to cut a relieved cutter having undercut cutting faces that will cut a contour which closely approximates the desired contour.

In shaping a milling cutter blank in accordance with my method a formed cutting tool may be used which has a contour the same as the contour which is to be cut by the finished blank. The tool is positioned for operation in a plane parallel to any axial plane through the blank and at a distance from such axial plane which varies in accordance with the undercut on the cutting faces of the blank teeth and the relief which is to be formed on the teeth of the blank. The plane of movement for the undistorted cutting tool lies between an axial plane through the blank and a plane parallel to the axial plane and tangent to the undercut circle. The plane of movement of the cutting tool is also parallel to the above mentioned planes. The undistorted cutting tool, when operating in a correct cutting plane, relieves the blank teeth and forms a distorted contour thereon which is adapted to cut the undistorted contour of the tool. Thus, the same formed tool may be used for shaping cutter blanks having their teeth provided either with radially arranged cutting faces or with teeth provided with non-radially arranged cutting faces. The contour of the cutting tool may be any irregular contour composed of either straight lines or curved irregular lines.

In order to shape milling cutter blanks which are provided with helical teeth having undercut or non-radially arranged cutting faces, means must be provided for taking care of the spiral arrangement of the teeth. Preferably in the case of cutters having a variable contour, a machine is provided such as disclosed in the patent to Friederich Müller, No. 1,429,617 dated September 19, 1922, or in the patent to Friederich Müller, No. 1,443,638 dated January 30, 1923. Moreover, the method may be carried on in the side relieving machine disclosed in the application of Friederich Müller, Serial No. 522,304 filed December 14, 1921. Preferably, in shaping a milling cutter having helical teeth provided with undercut cutting faces, the blank rotation is varied in order to effect the relieving movements in timed relation to the helical teeth. A narrow cutting tool, which is controlled or guided by a former member, is operated in a plane which passes through the blank outside the axis thereof, to compensate the relieving movements at different blank diameters for the non-radially arranged or undercut cutting faces on the teeth of the blank. The tool is fed intermittently along the cutter blank and the position of the cutting tool between each set of feeding movements is controlled in accordance with the contour of the former member. The relieving movements and the intermittent feeding movements are effected in the manner set forth in the above mentioned patents of Friederich Müller.

Although it is preferable to shape a milling cutter blank having helical teeth provided with undercut cutting faces by means of a pointed cutting tool, it is possible to shape such milling cutter blanks to certain contours by means of a formed cutting tool. If a formed tool is utilized to shape a milling cutter blank having helical teeth provided with non-radially arranged cutting faces, it is necessary to distort the contour of the tool in accordance with the inclination of the blank teeth. It is also possible to utilize an undistorted formed tool for shaping a milling cutter blank having straight flutes and undercut teeth and to effect side relief of the blank teeth. The latter operation is limited to contours composed of straight lines.

In the accompanying drawings:

Figure 1 is an enlarged diagrammatic view showing an undistorted tool in position for shaping and relieving a cutter blank.

Fig. 2 is a plan view of the cutter blank and tool shown in Fig. 1.

Fig. 3 is a diagrammatic view showing the position and the plane of movement of the cutting tool.

Figs. 4 and 5 are diagrammatic views showing the use of a formed tool in shaping and side relieving a cutter blank.

Fig. 6 is a plan view of a machine for practicing my invention.

Fig. 7 is a sectional view along the line 7—7 of the machine shown in Fig. 6, a former and former pin being shown in position.

Fig. 8 is a partial plan view of the machine shown in Figs. 6 and 7 and illustrates the use of a narrow cutting tool and making use of the former and former pin shown in Fig. 7.

Fig. 9 is a diagrammatic view showing the operation of the cutting tool in various planes.

Referring to Figs. 1 and 2 of the drawings, a milling cutter blank A is shown having teeth B provided with undercut or non-radially arranged cutting faces F. The cutting faces F of the teeth B are drawn tangent to a so-called hook or undercut circle having a radius equal to $e$, which is the amount of undercut on a cutting face if continued to the center of the blank. The axis of the cutter blank is designated by the reference character C and a formed tool T is shown in engagement with the cutter blank. The line CJ is assumed to represent an axial plane through the cutter blank A. The line KL is drawn tangent to the undercut circle and parallel to the line CJ. A plane is assumed to be drawn through line KL parallel to the axial plane through the line CJ. In Fig. 1 of the drawing the cutting face of one of the blank teeth is shown in the plane including the line KL. The cutting faces F on the teeth B are assumed to be straight and parallel to the blank axis. My method will first be described with reference to a blank having straight teeth.

In the methods heretofore practiced for relieving and shaping a milling cutter blank having teeth provided with undercut cutting faces, a distorted formed tool was operated either in an axial plane passing through the blank or in a plane tangent to the so-called undercut circle. Thus, referring to Fig. 1 of the drawings, the cutting tool would be operated either in the plane including the line CJ or in the plane including the line KL. In either case the contour of the tool would have to be distorted for so shaping the cutter blank as to cut the desired contour. In case the tool is operated in the axial plane including the line CJ, it is apparent the contour of the cutting tool would need to be shortened in order to shape the blank so as to cut the desired contour. Moreover, if the cutting tool is operated in the plane including the line KL, the contour of the cutting tool would need to be lengthened in order to shape the blank to cut the desired contour. In case the contour to be cut is very irregular neither of the above methods of using a distorted tool is very satisfactory.

Referring to Fig. 9 of the drawings, the necessity for distorting the formed cutting tool in either of the methods is apparent. The circle shown represents the undercut circle having a radius equal to $e$. The center of the circle and the axis of the cutter is designated by the reference character C as in Figs. 1 and 2. The line CR designates an axial plane passing through blank and the line VR designates a plane tangent to the undercut circle. In accordance with the two methods above indicated a formed cutting tool would be operated either along the line CR or along the line VR. It may also be assumed in the above figure that the plane of the line VR includes one of the undercut cutting faces of the blank and that joint R is located on the periphery of the cutter blank and at the maximum diameter of its irregular contour. Furthermore, it is assumed an undistorted tool having a length of contour SR is used to operate on the cutter blank.

If the tool is operated in the axial plane to shape and relieve the teeth on the blank, the point R on the tool will cut a like point R on the cutting face of the tooth shown. The point S on the contour of the tool will cut a point S' on the face of the shown tooth. The line SS' is formed in accordance with the relief cut on the teeth of the blank. The point S', when the blank is operated as a cutter, would cut a point $S^2$ in the cutting profile of the cutter. The length of the contour cut by the blank is equal to the length of the line $RS^2$. The length of line $RS^2$ is greater than the length of the line RS and accordingly the contour of a formed tool, which is operated in an axial plane passing through the blank, must be shortened in order to shape the blank to cut the desired contour.

If the formed cutting tool is operated in the plane tangent to the undercut circle, the contour of the tool will cut a contour having a length RU on the face of the tooth shown in Fig. 9. The length af the line RU is equal to the length of the line RS. However, when the finished blank is utilized as a milling cutter, the contour formed on the teeth of the blank will cut a contour having a length RU'. The contour thus formed has a length RU' which is less than the desired contour length RS. Accordingly, the contour of the formed tool, which is operated in a plane tangent to the undercut circle, must be lengthened in order to shape the blank to cut the desired contour. In order to cut the correct contour the face of each tooth of the blank must be cut with a distorted contour having a length $RS^3$. The lines $S'S^2$, $SS^3$ and UU' are arcs of circles having centers on the axis C of the cutter. It is apparent that an undistorted formed tool when operated in some plane between the axial plane and the plane tangent to the undercut circle must so shape the cutter blank as to cut the correct contour.

Referring to Figs. 1, 2 and 3 of the drawings, a mathematical determination will be given of the location of the plane in which an undistorted formed tool must be operated in order to shape a blank to cut the correct contour of the tool. The length of the contour to be cut by the finished blank is G'H' and may be measured on the line CJ as shown in Fig. 1 of the drawings. On the cutting face included in the plane through the line KL is a point $H^2$ which corresponds to the point H' on the line CJ. Moreover, the length of the line $CH^2$ equals the length of the line CH'. In Fig. 1, the plane including the cutting face of one of the teeth is shown in a horizontal plane parallel to the axial plane for convenience in figuring the location of the plane in which an undistorted tool may be operated to shape a blank. The point G' on the line CJ will have a corresponding point G² on the cutting face of the tooth. Thus, if the blank having a contour with a length G²H² cut on a cutting face thereof were rotated, a correct contour having a length G'H' would be cut. Continuing the relief lines of the shown tooth through the points G² and H² we obtain the intersection of such lines at points G and H with a plane which is formed at a distance $a$ from the axial plane through the line CJ. The distance $a$ is determined in a manner to be hereinafter set forth when reference is made to Fig. 3. When the distance $a$ is correctly determined the point H is directly over the point H' and the point G is directly over the point G'. Therefore, the length of the line GH or the length of the contour is exactly equal to the length of the line G'H'. The point G² is located more to the left of the point G', as shown in Fig. 1, than the point H² is located to the left of the point H'. The above fact is apparent by reason of the difference in curvature of the arc G²G' and the arc H²H'. However, the relieving curve G²G is much steeper than the relieving curve H²H. The two sets of curves just compensate each other so that independent of the radius used in determining the points G²G' or H²H', the points G and H are directly over the points G' and H'. Therefore, the contour including the line GH is identical with the contour including the line G'H' which is to be cut by the finished blank. When the contour GH is made the cutting contour of a relieving tool and the cutting contour is moved in its own plane at right angles to the axis C, while the blank is rotated, then points G and H describe spirals GG² and HH². The initial cutting face G²H² of the cutter blank is shown to be correct. Moreover, all the cutting edges which appear after resharpening will cut the correct contour, since the value of $a$ is not dependent on the diameter of the blank.

Referring to Fig. 3 of the drawings the mathematical proof of the position of the plane for operating an undistorted formed tool to shape a cutter blank will be given. Fig. 3 is the same as Fig. 1 except a portion only of the blank is shown drawn on a larger scale. The cutting face of a tooth is drawn in a horizontal plane KP² the same as the cutting face shown in Fig. 1. The plane including the line PM is assumed to be drawn a distance $a$ from the axis C of the blank.

Considering a point P' of a radius $r=$CP' on the cutting profile of the blank, a corresponding point P² is obtained on the cutting face of the illustrated tooth. The radius $r=$CP²$=$CP'.

Assuming the relief line of the shown tooth to be extended through the point P², an intersection of such line with the plane through the line PM is obtained in a point P. The abscissa $x$ of the point P is $x=$PM$=$PQ$+$QM. The point Q is obtained by the intersection of the circle including the points P² and P' with the plane through the line PM.

The length of the line PQ is equal to the relief which corresponds to the angle included between the lines P²M² and PM. The angle between the lines P²M² and PM is equal to the angle P²CQ, since the line P²M² can be moved to coincide with the line PM when rotated about C through the angle P²CQ.

Assume: A$=$amount of relief per tooth and N$=$number of teeth or flutes. The total relief for a complete revolution of the milling cutter blank, through an arc equal to $2\Pi$ is A$\times$N.

Consequently, $$PQ = \frac{AN}{2\Pi} \text{ (angle P}^2\text{CQ in arc measure)}.$$

Angle P²CQ$=$angle P²CP'$-$angle QCP'.
Angle P²CP'$=$arc corresponding to the known sine $$\frac{P^2N'}{CP^2} = \frac{e}{r}.$$

Angle P²CP' $=$ arc sin $\frac{e}{r}$ or the angle which has a sine of $\frac{e}{r}$.

Angle QCP' $=$ arc sin $\frac{a}{r}$.

Therefore, $$PQ = \frac{AN}{2\Pi}\left(\text{arc sin}\frac{e}{r} - \text{arc sin}\frac{a}{r}\right).$$

The value of QM must also be obtained in order to determine the value of X which equals PQ$+$QM.

$$QM = \sqrt{r^2 - a^2}$$

Therefore, $$x = \sqrt{r^2-a^2} + \frac{AN}{2\Pi}\left(\text{arc sin}\frac{e}{r} - \text{arc sin}\frac{a}{r}\right).$$

The above equation giving the value of X may be simplified by use of the "binomial theorem". The values of $e$ and $a$ are very small as compared with the value of $r$. The value of $e$ never exceeds one quarter of the minimum $r$, and the value of $a$ is less than the value of $e$.

By the binomial theorem.

$$\sqrt{r^2-a^2} = r\sqrt{1-\left(\frac{a}{r}\right)^2} = r\left(1 - \frac{1}{2}\left(\frac{a}{r}\right)^2 - \frac{1}{8}\left(\frac{a}{r}\right)^4\right).$$

The third and following numbers in the equation are very small and may be neglected without practically changing the result obtained.

Therefore, for practical purposes $\sqrt{r^2-a^2}$ may be taken equal to $r-\frac{1}{2}\frac{a^2}{r}$.

By reason of the small values of the angles being considered it is possible to substitute the known sines for the arcs in the above equations.

Thus, $$\text{arc sin}\frac{e}{r} - \text{arc sin}\frac{a}{r} = \frac{e}{r} - \frac{a}{r}.$$

Therefore we obtain the following equation which gives a closer value for $a$ than can be worked to with modern tools.

$$X = r - \frac{1}{2}\frac{a^2}{r} + \frac{AN}{2\Pi}\left(\frac{e}{r} - \frac{a}{r}\right).$$

$$X = r + \frac{1}{r}\left[(e-a)\frac{AN}{2\Pi} - \frac{1}{2}a^2\right].$$

Assume $\left[(e-a)\frac{AN}{2\Pi} - \frac{1}{2}a^2\right]$ is equal to zero which is true when $x$ is equal to $r$.

Therefore, $$(e-a)\frac{AN}{2\Pi} - \frac{1}{2}a^2 = 0.$$

$$a^2 + 2a\frac{AN}{2\Pi} - 2e\frac{AN}{2\Pi} = 0.$$

$$a = \frac{AN}{2\Pi} \pm \sqrt{\left(\frac{AN}{2\Pi}\right)^2 + 2e\left(\frac{AN}{2\Pi}\right)}$$

When the value of $a$ is obtained by the above equation, the abscissa X of any point P is equal to the radius $r$ of the corresponding point P' on the cutting profile of the milling cutter blank. Thus, the length of the contour cut by the finished cutter blank is the same as the length of the contour in the plane of the line PM. Accordingly, when an undistorted formed tool is operated in the plane of the line PM which is located a distance $a$ from the axial plane through the line CP', the contour of the formed tool engages with all points of the correct relieved surface on the blank. The tool so cuts a distorted contour on the teeth of the blank that the correct contour of the tool will be cut by the finished blank.

Theoretically, it is possible to obtain two solutions of the above equation, and to obtain two values of the distance $a$. However, the negative solution is of no practical utility. The positive solution in which $$a = \sqrt{\left(\frac{AN}{2\Pi}\right)^2 + 2e\frac{AN}{2\Pi}} - \frac{AN}{2\Pi}$$

is utilized for obtaining a value of $a$ for setting the formed cutting tool. In the above equation, it should be noted the value of $a$ depends on the amount of relief and undercut but is independent of the diameter of the cutter blank. It is preferable to form a table giving the values of $a$ for the different values of relief and undercut.

Referring to Figs. 6, 7 and 8 of the drawings, a machine is diagrammatically illustrated for relieving a milling cutter blank in accordance with my invention. In regard to the details of the machine, the constructions shown in the above mentioned applications of Friederich Müller are preferred. The machine shown in Figs. 6, 7 and 8 may be utilized for operating a broad, formed cutting tool or for operating a narrow cutting tool in accordance with the contour of a former member.

In Figs. 6 and 7 of the drawings a cutter blank A is shown mounted on a mandrel 1. Any suitable means are provided for supporting and rotating the mandrel 1. A carriage 2, which is movable along ways 3—3, supports a transversely movable slide 4. An independent movable transverse slide 5 is carried by the slide 4. The slide 5 carries a tool slide 6 which carries a cutting tool T. The slide 6 permits preliminary adjustments of the cutting tool T.

The cutting tool T is mounted on two wedge members 7 and 8 between the side walls 9 and 10 of the tool post. The wedge members 7 and 8 adjust the cutting tool in engagement with a bar 11. The bar 11 is secured to the top of the side walls 9 and 10 by means of bolts 12. A screw 13 which is mounted on the face plate 14 secured to the front of the tool post, is suitably connected to the wedge member 8 and serves to operate the wedge members for holding the cutting tool in engagement with the bar 11. The position of the bar 11 serves to determine the cutting plane of the tool T relative to an axial plane through the cutter blank A. Preferably, the tool post is so constructed that the cutting tool will operate in an axial plane when the bar 11 is mounted directly on the side walls 9 and 10. When it is desired to operate the cutting tool in a plane above the axial plane, suitable liners 15 are inserted in position between the side walls 9 and 10 and the bar 11. The liners 15 have a thickness the same as the distance the tool plane is to be positioned and actuated above the axial plane. In accordance with my method, the liners 15 each have a thickness equal to the value $a$ in the equations heretofore described.

A suitable relieving mechanism is mounted on the carriage 2 and on the transverse movable slide 4 for reciprocating the slide 5 to effect relieving movements of the tool T. A longitudinal shaft 16, which carries a cam member 17, is rotatably mounted in a bearing on a bracket 18. The bracket 18 is carried by the slide 4. A lever 19, which is pivotally mounted on the slide 4, engages the cam member 17. The lever 19, near the upper end thereof, engages the end of the slide 5. A spring member 21 serves to hold the slide 5 in engagement with the lever 19. It will be seen that when the shaft 16 and the cam 17 are rotated, the lever 19 will be oscillated, thus reciprocating the slide 5 and the cutting tool T. A longitudinal shaft 22, which is rotated in any suitable manner, is provided for rotating the shaft 16 and the cam member 17. A worm member 23, which is longitudinally movable with the carriage 2, is splined to the shaft 22. A transverse horizontal shaft 24 carries a worm wheel 25 which meshes with the worm member 23. The horizontal shaft 24 is mounted in any suitable manner on the carriage 2. A bevel gear wheel 26, which meshes with a bevel wheel 27, is slidably mounted on the shaft 24. The bevel gear wheel 26 is engaged by the bracket 18 and is thus held in mesh with the bevel gear wheel 27 when the slide 4 and the parts connected thereto move transversely. The shaft 22 is driven in proper timed relation with the spindle rotation in any suitable manner so that normally for any given position of the carriage, the cam member 17 is given as many complete rotations for each rotation of the blank as the blank has teeth.

In operating the machine in accordance with my method, the cutting tool T is formed in accordance with the contour desired to be cut by the finished cutter blank. The distance $a$ of the cutting plane above an axial plane is figured in accordance with the equation heretofore set forth. Liners 15 of the thickness $a$ are inserted between the bar 11 and the side walls of the tool post in the manner heretofore set forth. The shaft 22 is rotated in timed relation to the rotation of the blank A. The shaft 22 effects operation of the cam member 17 through the worm wheel 25, shaft 24 and the bevel gear wheels 26 and 27. The cam member 17 operates the lever 19 to effect relieving movements of the slide 5 and the cutting tool T. In the above operation no feeding movements of the cutting tool longitudinally along the blank are required and moreover no former member is required for governing the movements of the cutting tool.

When it is desired to shape a cutter blank having helical teeth provided with undercut or non-radially arranged cutting faces, a former member and a former pin are preferably provided for guiding the cutting tool. However, it is to be understood that certain contours may be cut on blanks having helical teeth provided with undercut cutting faces by distorting a formed tool in accordance with the inclination of the cutting teeth relative to the blank axis. Only formed tools having straight line contours may be utilized for such a purpose, inasmuch as contours other than contours composed of straight lines are not readily distorted in accordance with the spiral arrangement of the blank teeth.

Referring particularly to Fig. 8 of the drawings, a former pin 30 is shown mounted on the slide 4. The former pin 30 is formed exactly to the shape of a narrow cutting tool 31, which is mounted similarly to the mounting of the formed cutting tool T shown in Figs. 6 and 7. A former member 32 is secured to the main frame of the machine and has a contour exactly the same as the contour to be cut by the finished cutter blank. A spring member 33 is provided for forcing the slide 4 towards the rear to hold the former pin 30 in engagement with the former member 32. A feed shaft 35, which is operated in any suitable manner, is provided for effecting longitudinal movement of the carriage 2 along the machine. During such longitudinal movement, the slide 4 will be compelled to move transversely under the guidance of the former member 32. Consequently, the tool 31 is caused to follow an outline which is exactly the same as the contour of the former member 32. If so desired, the carriage may be fed intermittently in the manner set forth in the applications of Friederich Müller mentioned above.

In order that the relieving movements of the tool 31 may be varied in accordance with the helicoidal cutting faces on the teeth of the blank, I preferably provide means for supplementally rotating the blank in proportion to the longitudinal movement of the tool. As illustrated in Fig. 6 of the drawings, the mandrel 1 is engaged by a chuck 36 on a spindle 37. Power for rotating the spindle 37 is supplied through a sleeve 38 which has splined engagement with a similar sleeve 39. A rod 40 and a forked lever 41 are provided for causing the sleeve 39 to move longitudinally with the carriage 2. The spindle 37 is fixed against longitudinal movement and extends into the sleeve 39. The sleeve 39 is provided with a helical groove 42 having the same lead as the helicoidal cutting faces on the teeth of the blank being cut. A pin 43 on the spindle 37 projects into the groove 42 thus transmitting power from the sleeve 39 to the spindle 37. It will be seen that the construction permits the spindle to be driven by means of the sleeve 38 and that the spindle is supplementally rotated in proportion to the longitudinal movement of the carriage 2 and the cutting tool. This supplemental movement is just sufficient to enable the tool to properly engage the helical teeth. Inasmuch as my invention relates to a method and not to any particular machine, it is deemed unnecessary to further describe a relieving machine for practicing my invention.

In Fig. 7 a former 32 and former pin 30 are shown in position. It will be understood, however, that when a formed cutting tool T is used, the former 32 and pin 30 are not required. It is only when a tool, such as shown in Fig. 8 and indicated by the numeral 32, is employed that these members are required.

The methods disclosed in this application may also be utilized for relieving thread cutting hobs having spiral flutes and undercut teeth. A formed tool is used having a straight cutting edge. The inclination of the cutting edge is varied relatively to the hob axis in accordance with the spiral flutes on the hob. The tool is operated in a plane located a distance $a$ above the axial plane passing through the hob as heretofore set forth.

Referring to Figs. 4 and 5 of the drawings, the application of my invention in side relieving a cutter blank will be described. In Fig. 4 of the drawings, the axis of a cutter blank is designated by the character C. The straight cutting edge $y$ of a cutting tool is assumed to be placed at an angle $o$ with respect to a line perpendicular to the blank axis. The point Z is considered to be any point on the cutting edge $y$.

The point Z assumes a position Z′ or a position Z″ according to whether the relieving movement of the tool is effected perpendicularly or parallelly to the axis of the blank. In many cases, the relief effected perpendicularly in a blank axis is called radial relief and the relief effected parallelly to the blank axis is called axial relief. The combination of the two relieving movements is sometimes called oblique relief. In Fig. 4 it is apparent for certain relief that the cutting edge $y$ of the tool will arrive at the same position whether the relieving movement is effected parallelly or perpendicularly to the axis of the blank. The position of the point Z when the tool effects a relieving movement perpendicularly to the blank axis is indicated by the character Z′. The positions of the point Z after relieving movements obliquely and parallelly to the blank axis are respectively indicated by the reference characters $Z^0$ and Z″.

It is apparent from the diagram shown in Fig. 4 that tan $$0 = \frac{Z''Z}{Z'Z}.$$

Accordingly the radial relief which corresponds to a given side relief is $$\frac{Z''Z}{\tan 0}.$$

The radial relief which corresponds to an oblique relief is $ZZ^0$ of an angle V is $$\left(Z^0Z \cos V + \frac{Z^0Z \sin e\, V}{\tan 0}\right).$$

$$Z'Z = ZZ^3 + Z^3Z'.$$

$$\text{Tan } 0 = \frac{Z^3Z^0}{Z^3Z'} \text{ and } Z^3Z' = \frac{Z^3Z^0}{\tan 0}$$

$$\cos V = \frac{Z^3Z}{Z^0Z} \text{ and } ZZ^3 = Z^0Z \cos V$$

$$\sin V = \frac{Z^3Z^0}{Z^0Z} \text{ and } Z^3Z^0 = Z^0Z \sin V$$

Therefore $$Z'Z = Z^0Z \cos V + \frac{Z^3Z^0}{\tan 0} = Z^0Z \cos V + \frac{Z^0Z \sin V}{\tan 0}$$

Thus, radial relief $$= \left(\frac{Z''Z}{\tan 0}\right).$$

Moreover radial relief $$= Z^0Z\left(\cos V + \frac{\sin e\, V}{\tan 0}\right).$$

Accordingly, since the cutting edge of the relieving tool assumes the same position on being relieved through a distance ZZ′, on being obliquely relieved through a distance $ZZ^0$ and on being relieved axially through a distance Z″Z, the same method of compensating for the undercut cutting faces can be used in each case. The distance $a$ for setting the cutting tool above an axial plane can be obtained for an axial or oblique relieving movement by first reducing the axial or the oblique relief to radial relief and then using the equation for $a$ heretofore given. When the cutting edge of the milling cutter and correspondingly the cutting edge of the relieving tool is not straight but curved as shown in Fig. 5 of the drawings, then axial relief or oblique relief cannot be accurately reduced to radial relief. There is a certain difference in the position $Z^2$ of the cutting edge at side relief as compared to the position Z′ of the cutting edge at the corresponding radial relief. This difference varies in accordance with the curve of the cutting edge.

It will be understood that such changes and modifications may be made in my invention as fall within the limits of the appended claims.

What I claim is:

1. The method of shaping a milling cutter blank, having teeth provided with non-radially arranged cutting faces, to cut a contour other than a straight line parallel to the blank axis, which consists in providing a formed tool having an undistorted cutting contour, in effecting relative rotation between the tool and the blank, and in effecting relative translatory relieving movements between the blank and the formed tool for cutting a distorted contour on the blank teeth which is adapted to cut the undistorted contour of the tool.

2. The method of shaping a milling cutter blank having teeth provided with non-radially arranged cutting faces, which consists in providing a formed tool having an undistorted cutting contour, in positioning the tool relative to the blank in accordance with the non-radially arranged cutting faces on the teeth and the relief to be formed on the teeth, in effecting relative rotation between the tool and the blank, and in effecting relative translatory movement between the blank and the formed tool for relieving the blank teeth while cutting a distorted contour which is adapted to cut the undistorted contour of the tool.

3. The method of shaping a milling cutter blank having teeth provided with non-radially arranged cutting faces, which consists in rotating the blank, in providing a formed tool having an undistorted cutting contour, and in effecting translatory movement of the formed tool for relieving the blank teeth while cutting a distorted contour on the blank teeth which is adapted to cut the undistorted contour of the tool.

4. The method of shaping a milling cutter blank having teeth provided with non-radially arranged cutting faces, which consists in rotating the blank, in positioning a formed tool having an undistorted cutting contour in a plane located a distance from the blank axis according to the relief to be cut on the teeth and the non-radially arranged cutting faces, and in effecting translatory relieving movements of the formed tool for cutting a distorted contour on the blank teeth which is adapted to cut the undistorted contour of the tool.

5. The method of shaping a milling cutter blank having teeth provided with non-radially arranged cutting faces, which consists in rotating the blank, in providing a cutting tool having a cutting contour the same as the contour to be cut by the finished blank, in positioning the tool for movement in a plane other than a plane through the blank axis, and in effecting relieving movements by the tool to relieve the teeth on the blank while cutting a distorted contour on the teeth which is adapted to cut the undistorted contour of the tool.

6. The method of shaping a milling cutter blank having teeth provided with non-radially arranged cutting faces, which consists in rotating the blank, in providing a formed tool having a non-rectilinear contour the same as the contour to be cut by the finished cutter blank, in operating the formed tool in a plane other than a plane through the blank axis for spirally relieving the blank teeth while cutting a distorted contour on the blank teeth which is adapted to cut the contour of the tool.

7. The method of shaping a milling cutter blank, having teeth provided with non-radially arranged cutting faces, to cut a predetermined contour other than a straight line, which consists in rotating the blank, in providing a formed cutting tool having a cutting contour the same as the contour to be cut by the finished blank, in operating the cutting tool in a plane parallel to and at a predetermined distance from the blank axis for relieving the blank teeth while cutting a distorted contour on the blank teeth which is adapted to cut the predetermined contour.

8. The method of shaping a milling cutter blank, having teeth provided with non-radially arranged cutting faces, to cut a predetermined contour other than a straight line parallel to the blank axis, which consists in rotating the blank, in providing a formed cutting tool having a cutting contour the same as the contour to be cut by the blank, in positioning the cutting tool in a plane parallel to and at a predetermined distance from a plane passing through the blank axis for cutting a distorted contour on the blank teeth which is adapted to cut the predetermined contour, and in effecting relieving movements of the tool in said plane parallel to a plane through the blank axis for shaping and for spirally relieving the blank teeth.

9. The method of shaping a milling cutter blank having teeth provided with undercut or non-radially arranged cutting faces, which consists in rotating the blank, in providing a formed tool having a non-rectilinear cutting contour the same as the contour to be cut by the finished blank, and in operating the cutting tool in a plane parallel to any axial plane through the blank and at a distance from such axial plane which varies according to the degree of undercut on the teeth of the blank for relieving the blank teeth while cutting a distorted contour on the blank teeth which is adapted to cut the contour of the tool.

10. The method of shaping a milling cutter blank having teeth provided with undercut or non-radially arranged cutting faces, which consists in rotating the blank, in providing a formed tool having a cutting contour the same as the contour to be cut by the finished blank, and in setting the cutting tool for operating in a plane parallel to any axial plane through the blank and at a distance from such axial plane which varies according to the degree of undercut on the teeth of the blank, and means for operating the cutting tool to shape and to spirally relieve the teeth on the blank.

11. The method of shaping a milling cutter blank having teeth provided with undercut or non-radially arranged cutting faces, which consists in rotating the blank, in providing a formed cutting tool having a cutting contour the same as the contour to be cut by the blank, in setting the cutting tool for operation in a plane parallel to any axial plane through the blank and at a distance from the axial plane which varies in accordance with the undercut on the blank teeth and the relief to be cut on the teeth, and in operating the cutting tool to relieve the teeth on the blank.

12. The method of shaping a milling cutter blank having teeth provided with undercut or non-radially arranged cutting faces, which consists in rotating the blank, in providing a formed tool having a cutting contour the same as the contour to be cut by the finished blank, and in setting the cutting tool for operation in a plane parallel to any axial plane through the blank and at a distance from such axial plane which varies in accordance with the undercut on the blank teeth and the relief to be cut on the teeth, the position of the cutting plane for the tool being measured a distance in a direction opposite to the direction of rotation of the blank, and in operating the cutting tool to spirally relieve the teeth on the blank.

13. The method of shaping a milling cutter blank having teeth provided with undercut cutting faces, which consists in rotating the blank, in so positioning a cutting tool relative to an axial plane through the blank as to compensate the relieving operation for the undercut cutting faces, in operating the tool relative to the blank for shaping the blank to cut a predetermined non-rectilinear contour, and in operating the tool to relieve the teeth on the blank.

14. The method of shaping a milling cutter blank having helical teeth provided with undercut cutting faces, which consists in rotating the blank, in so positioning a cutting tool relative to the blank as to compensate the relieving operation for the undercut cutting faces, in operating the tool relative to the blank for shaping the blank to cut a predetermined contour, in varying the blank rotation in accordance with the helical teeth thereon, and in operating the tool to relieve the teeth on the blank.

15. The method of shaping a milling cutter blank having teeth provided with undercut or non-radially arranged cutting faces, which consists in rotating the blank, in positioning a cutting tool in a plane other than an axial plane through the blank axis and at such distance from the axial plane as to compensate the relieving operation in accordance with the undercut cutting faces, in intermittently feeding the tool along the blank, in varying the position of the tool between feeding movements for cutting the blank to different diameters, and in operating the tool to spirally relieve the teeth on the blank.

16. The method of shaping a milling cutter blank having helical teeth provided with undercut or non-radially arranged cutting faces, which consists in rotating the blank, in positioning a cutting tool in a plane parallel to an axial plane through the blank and at such distance from the axial plane as to compensate the relieving operation in accordance with the undercut cutting faces, in intermittently feeding the tool along the blank, in varying the position of the tool between feeding movements to cut the blank to different diameters, in varying the blank rotation in accordance with the helical teeth thereon, and in operating the cutting tool to relieve the blank teeth.

17. The method of shaping a milling cutter blank having helical teeth provided with non-radially arranged cutting faces, which consists in rotating the blank, in providing a cutting tool in operative relation to the blank, in operating the cutting tool in a plane parallel to an axial plane through the blank for relieving the blank teeth and for shaping the blank to cut a predetermined contour, the tool plane being so located relative to such axial plane as to compensate the relieving operation for the non-radial cutting faces on the teeth of the blank, and in varying the blank rotation in accordance with the helical teeth thereon.

18. The method of shaping a milling cutter blank having helical teeth provided with undercut or non-radially arranged cutting faces, which consists in rotating the blank, in providing a cutting tool for operation in a plane parallel to any axial plane through the blank, the plane of movement of the tool being located a distance from the axial plane according to the undercut cutting faces and the relief to be cut on the blank teeth, in operating the tool to relieve the blank teeth and to cut the blank to different diameters, and in varying the blank rotation in accordance with the helical teeth on the blank.

19. The method of shaping a milling cutter blank having helical teeth provided with undercut or non-radially arranged cutting faces, which consists in rotating the blank, in providing a narrow cutting tool for operation in a plane parallel to an axial plane through the blank, in providing a former member having a predetermined non-rectilinear contour, the same as the contour to be cut by the finished blank, in operating the cutting tool in accordance with the contour of the former for shaping the blank to cut the contour of the former member, in effecting relieving movements by the tool, and in varying the blank rotation in conformity with the helical teeth thereon.

20. The method of shaping a milling cutter blank having helical teeth provided with undercut or non-radially arranged cutting faces, which consists in rotating the blank, in providing a cutting tool for operation in a plane parallel to any axial plane through the blank, the tool plane being located a distance from the axial plane according to the undercut on the cutting faces of the teeth and the relief to be formed on the blank teeth, in providing a former member having a predetermined contour the same as the contour to be cut by the finished blank, in effecting feeding movements of the cutting tool along the blank, in transversely moving the tool between the feeding movements under the guidance of the former member for shaping the blank to cut the contour of the former member, in varying the blank rotation in accordance with the helical teeth thereon, and in operating the cutting tool to relieve the blank teeth.

21. The method of shaping a milling cutter blank, having teeth provided with non-radially arranged cutting faces, which consists in rotating the blank, in providing a formed cutting tool having a cutting contour the same as the contour to be cut by the finished blank and located in a single plane, in positioning the cutting tool for movement in a plane parallel to an axial plane through the blank, and in operating the cutting contour of the tool in said plane parallel to an axial plane for spirally relieving the blank teeth along lines extending backward and inward and for shaping the blank teeth to cut the contour of the tool.

In testimony whereof, I hereto affix my signature.

ERNEST WILDHABER.